United States Patent
Saito et al.

(10) Patent No.: US 11,233,807 B2
(45) Date of Patent: Jan. 25, 2022

(54) EFFECTIVE DETECTION OF A COMMUNICATION APPARATUS PERFORMING AN ABNORMAL COMMUNICATION

(71) Applicant: FUJITSU LIMITED, Kawasaki (JP)

(72) Inventors: Satomi Saito, Kawasaki (JP); Yuki Fujishima, Yokohama (JP); Satoru Torii, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 166 days.

(21) Appl. No.: 16/372,472

(22) Filed: Apr. 2, 2019

(65) Prior Publication Data

US 2019/0312901 A1    Oct. 10, 2019

(30) Foreign Application Priority Data

Apr. 6, 2018    (JP) .............................. JP2018-073607

(51) Int. Cl.
*H04L 29/06*    (2006.01)

(52) U.S. Cl.
CPC ...... *H04L 63/1425* (2013.01); *H04L 63/0236* (2013.01); *H04L 63/101* (2013.01); *H04L 63/102* (2013.01)

(58) Field of Classification Search
CPC ............ H04L 63/0236; H04L 63/0892; H04L 63/101; H04L 63/102; H04L 63/1425; H04L 63/1441; H04L 2463/144; H04L 2463/146

See application file for complete search history.

(56) References Cited

U.S. PATENT DOCUMENTS

| | | | |
|---|---|---|---|
| 7,249,374 B1 * | 7/2007 | Lear ....................... | G06F 21/31 |
| | | | 709/203 |
| 8,370,407 B1 * | 2/2013 | Devarajan ........... | H04L 63/1416 |
| | | | 707/899 |
| 8,561,188 B1 * | 10/2013 | Wang .................. | H04L 63/1425 |
| | | | 726/22 |

(Continued)

FOREIGN PATENT DOCUMENTS

| | | |
|---|---|---|
| JP | 2005-275683 | 10/2005 |
| JP | 6017004 B1 | 10/2016 |

(Continued)

OTHER PUBLICATIONS

Eslahi et al. "A Data Collection Approach for Mobile Botnet Analysis and Detection" [Online], Oct. 1, 2014 [Retrieved on: Sep. 20, 2021], www.ieee.org, IEEE Symposium on Wireless Technology and Applications (ISWTA), Retrieved from: < https://ieeexplore.ieee.org/abstract/document/6981187 > (Year: 2014).*

(Continued)

*Primary Examiner* — Eric W Shepperd
(74) *Attorney, Agent, or Firm* — Fujitsu Patent Center

(57) ABSTRACT

An apparatus extracts a server process from a communication in a network to generate log data in which a combination of addresses of access sources in the server process is recorded, and compares a combination of past addresses recorded in the log data with a combination of addresses in a specific target access to identify a first communication apparatus performing an abnormal communication.

6 Claims, 12 Drawing Sheets

(56) References Cited

U.S. PATENT DOCUMENTS

| | | | | |
|---|---|---|---|---|
| 8,578,493 | B1* | 11/2013 | Cowan | G06F 21/554 726/23 |
| 8,745,731 | B2* | 6/2014 | Achan | H04L 63/1441 726/22 |
| 8,838,570 | B1* | 9/2014 | English | H04L 63/1408 707/709 |
| 8,874,763 | B2* | 10/2014 | Ehrlich | H04L 63/1425 709/228 |
| 9,038,178 | B1* | 5/2015 | Lin | H04L 63/02 726/23 |
| 9,294,498 | B1* | 3/2016 | Yampolskiy | H04L 63/1458 |
| 9,781,158 | B1* | 10/2017 | Wittenstein | H04L 63/1466 |
| 10,313,372 | B2* | 6/2019 | Heilig | H04L 63/1425 |
| 10,454,950 | B1* | 10/2019 | Aziz | H04L 63/1441 |
| 2008/0307526 | A1* | 12/2008 | Chung | H04L 63/1416 726/23 |
| 2009/0199296 | A1* | 8/2009 | Xie | G06F 21/316 726/23 |
| 2012/0173710 | A1* | 7/2012 | Rodriguez | H04L 43/04 709/224 |
| 2012/0304297 | A1* | 11/2012 | Chung | H04W 12/122 726/23 |
| 2014/0181968 | A1* | 6/2014 | Ge | H04L 63/1425 726/23 |
| 2015/0071085 | A1* | 3/2015 | Tsirinsky-Feigin | H04L 12/6418 370/242 |
| 2015/0264068 | A1* | 9/2015 | Beauchesne | H04L 63/1416 726/23 |
| 2016/0065601 | A1* | 3/2016 | Gong | H04L 63/1416 726/23 |
| 2016/0149930 | A1* | 5/2016 | Casaburi | H04W 12/122 726/1 |
| 2016/0156644 | A1* | 6/2016 | Wang | H04L 63/0236 726/23 |
| 2017/0310692 | A1* | 10/2017 | Ackerman | H04L 63/1425 |
| 2017/0310703 | A1* | 10/2017 | Ackerman | H04L 63/1425 |
| 2018/0004948 | A1* | 1/2018 | Martin | G06F 21/566 |
| 2018/0048656 | A1* | 2/2018 | Bingham | H04L 63/102 |
| 2018/0300974 | A1 | 10/2018 | Okubo et al. | |
| 2019/0149540 | A1 | 5/2019 | Shimazu | |
| 2019/0190926 | A1* | 6/2019 | Choi | H04L 63/1416 |

FOREIGN PATENT DOCUMENTS

| | | |
|---|---|---|
| JP | 2017-201466 A | 11/2017 |
| KR | 10-2015-0026345 A | 3/2015 |

OTHER PUBLICATIONS

Zeidanloo et al. "Botnet Detection Based on Traffic Monitoring" [Online], 2010 [Retrieved on: Sep. 20, 2021], www.IEEE.org, 2010 International Conference on Networking and Information Technology, Retrieved from : < https://ieeexplore.ieee.org/abstract/document/5508552 > (Year: 2010).*

Junji Nakazato et al., "A Suspicious Process Analysis in Cooperation with End Hosts", Journal of the National Institute of Information and Communications Technology, vol. 63, No. 2, pp. 83-91, Dec. 2016 (9 pages).

Japanese Office Action dated Sep. 21, 2021 for corresponding Japanese Patent Application No. 2018-073607, with English Translation, 10 pages.

* cited by examiner

FIG. 6A

| TIME | SOURCE IP ADDRESS | SOURCE IP ADDRESS |
|---|---|---|
| 2018/4/30 9:00 | 1.1.1.1 | 2.1.1.2 |
| 2018/4/30 9:01 | 1.1.1.2 | 2.1.2.1 |
| 2018/4/30 9:02 | 1.1.2.1 | 2.1.2.1 |
| : | : | : |

| AGGREGATION TIME | SERVER PROCESS IP ADDRESS | GROUP OF CLIENT IP ADDRESSES |
|---|---|---|
| 2018/5/1 0:00 | 2.1.2.1 | 1.1.1.1 |
| 2018/5/1 0:00 | 2.1.1.2 | 1.1.1.2, 1.1.2.1 |
| : | : | : |

| DETERMINATION TIME | ABNORMAL COMMUNICATION APPARATUS IP ADDRESS |
|---|---|
| 2018/5/1 0:00 | 2.1.1.1 |
| : | : |

~103

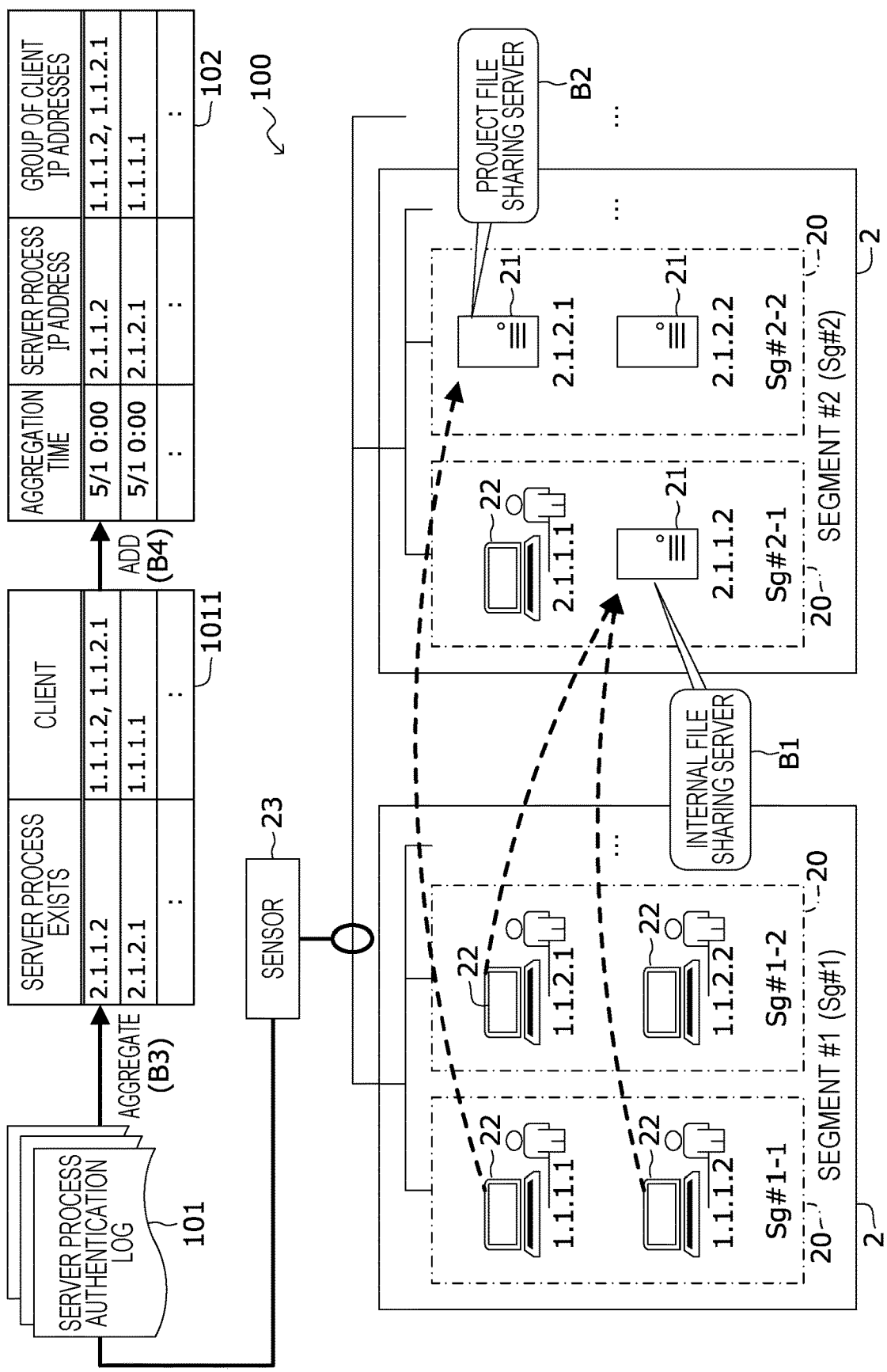

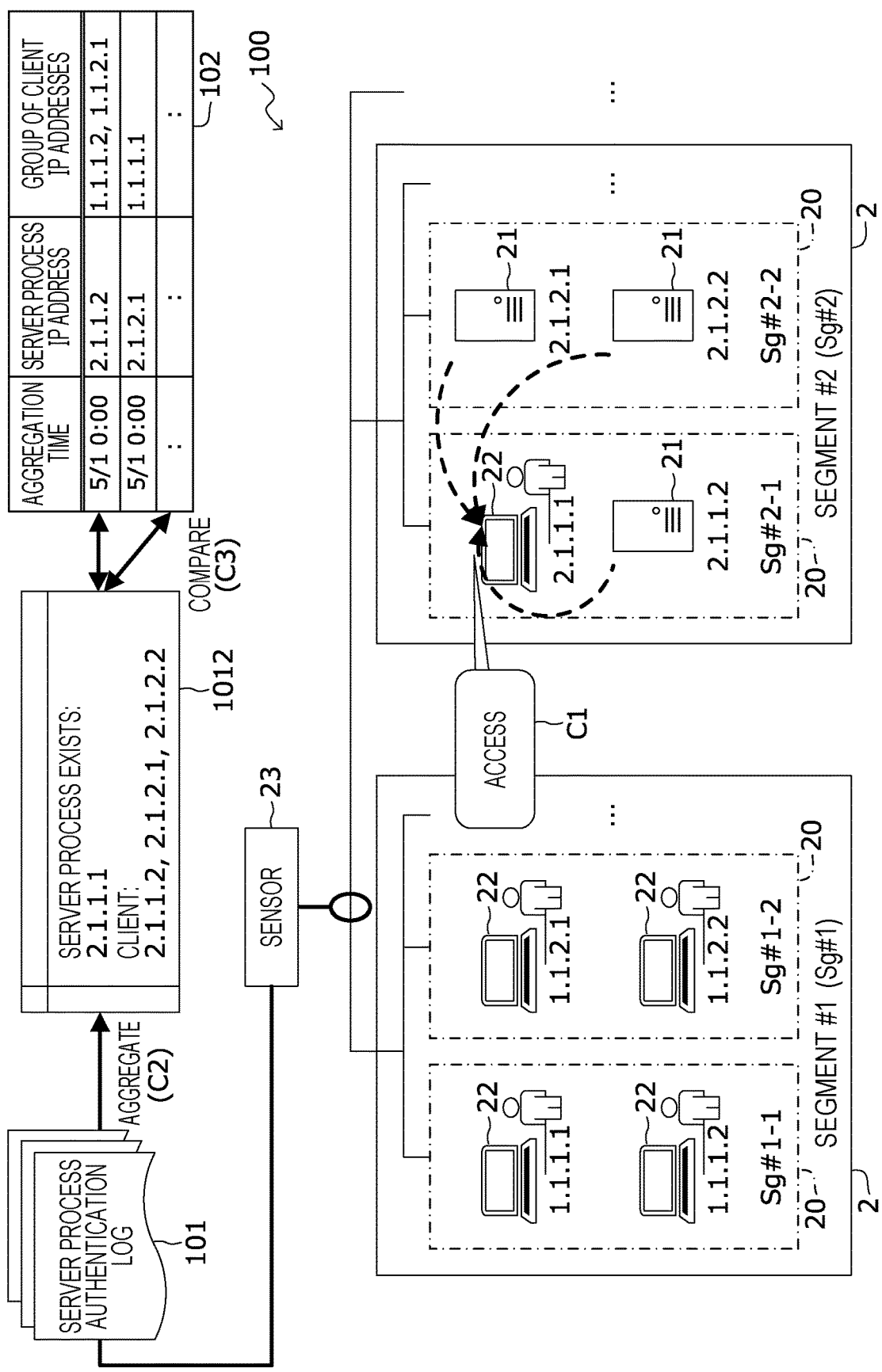

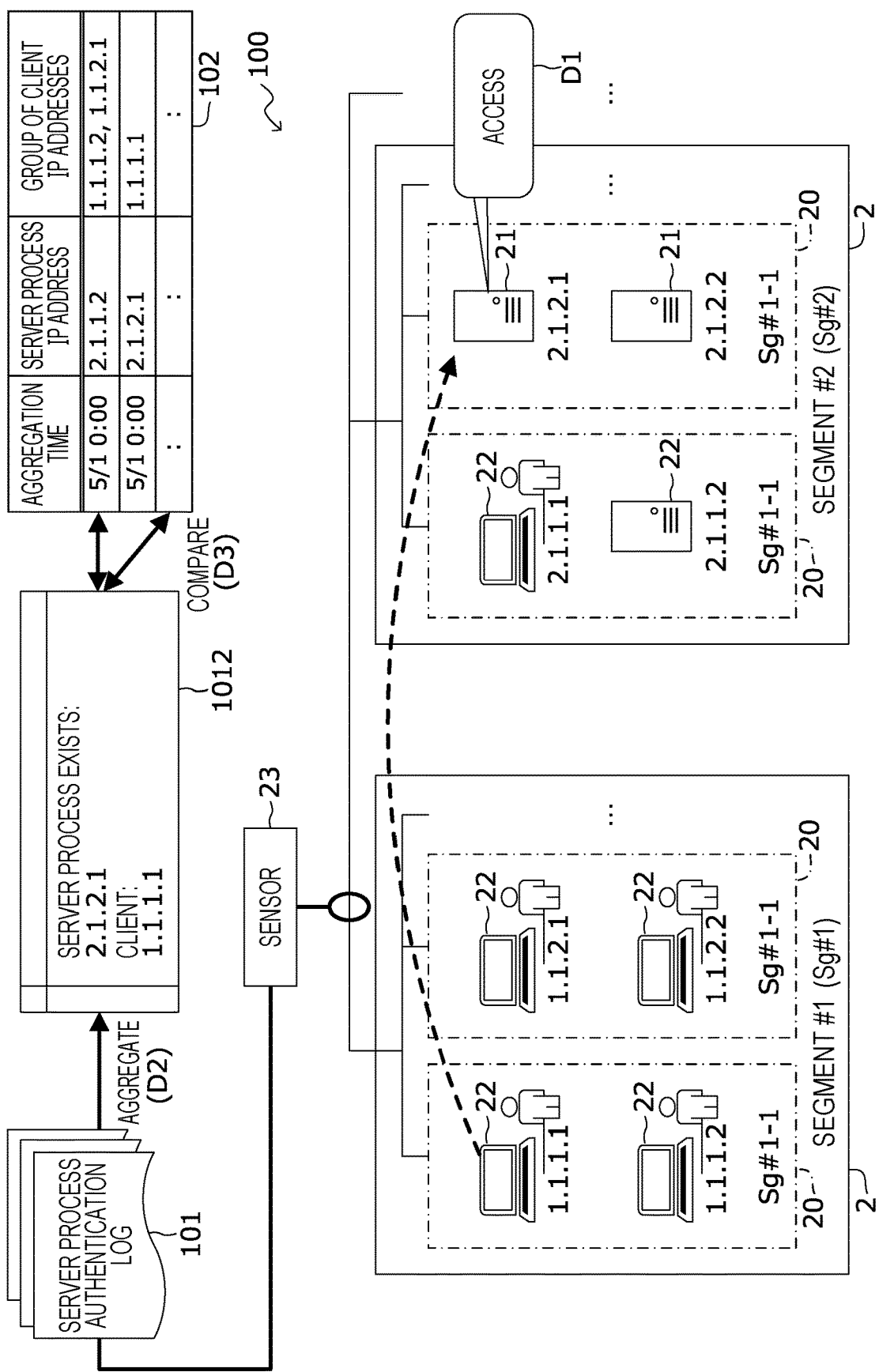

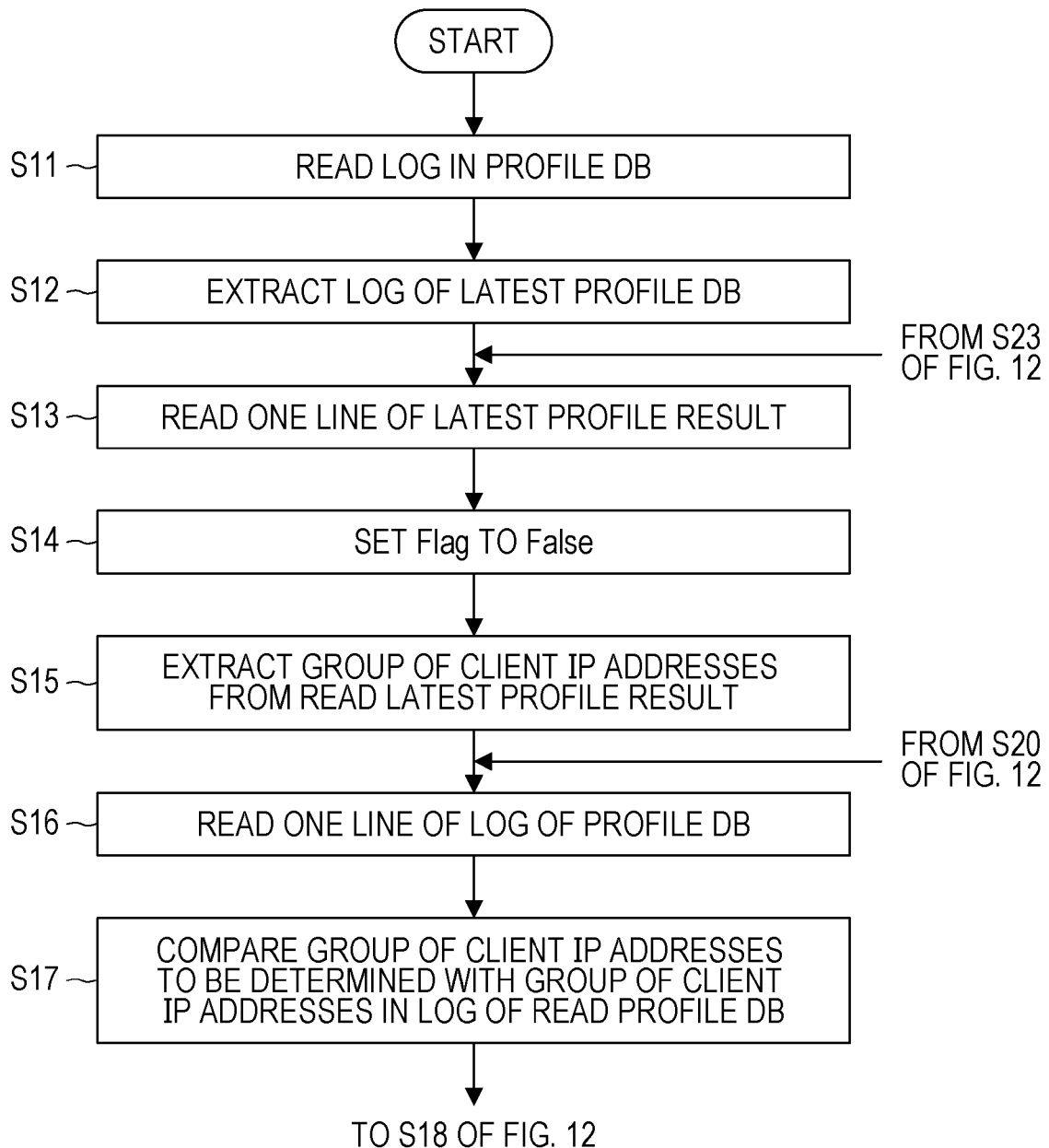

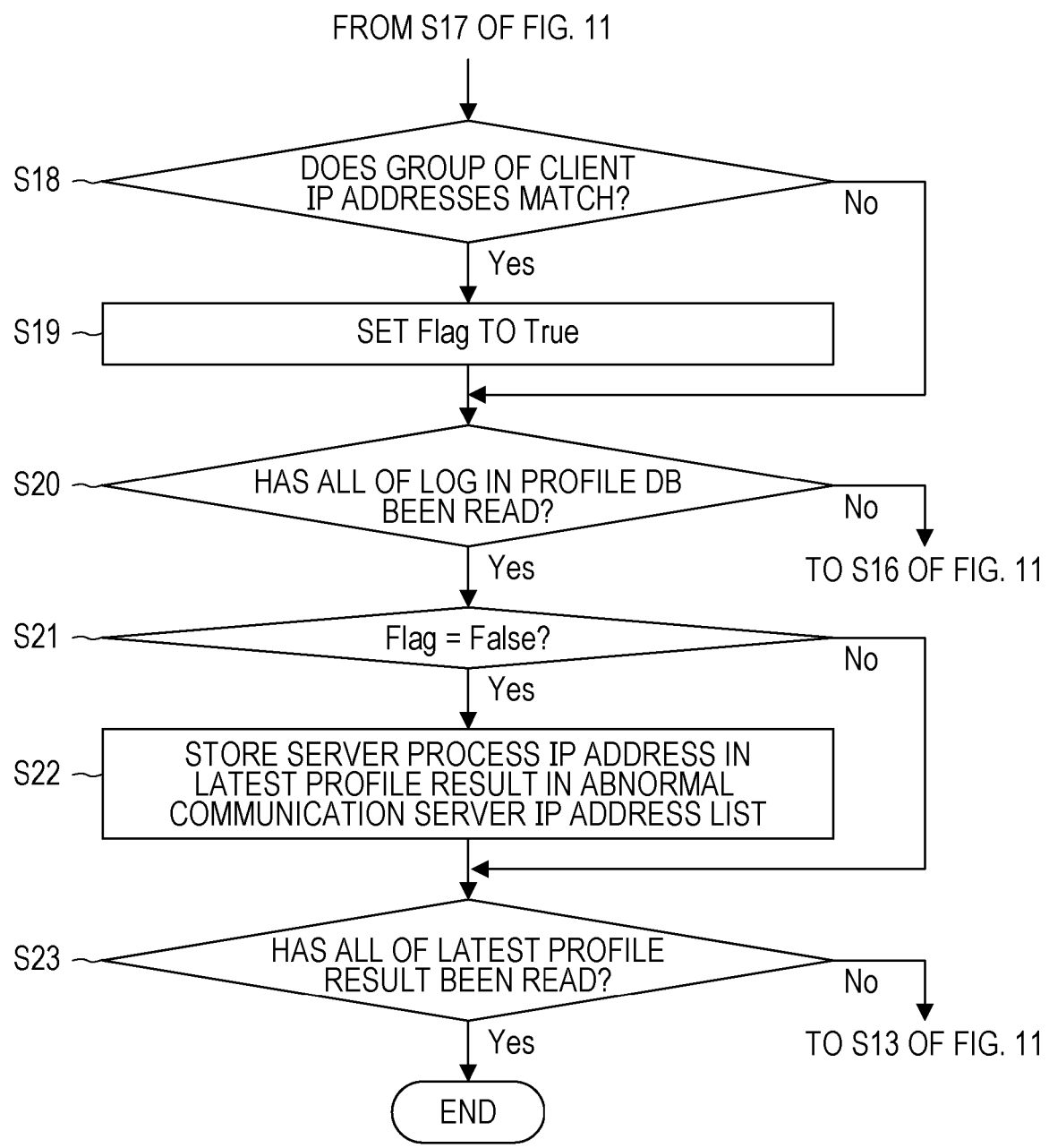

EFFECTIVE DETECTION OF A COMMUNICATION APPARATUS PERFORMING AN ABNORMAL COMMUNICATION

CROSS-REFERENCE TO RELATED APPLICATION

This application is based upon and claims the benefit of priority of the prior Japanese Patent Application No. 2018-73607, filed on Apr. 6, 2018, the entire contents of which are incorporated herein by reference.

FIELD

The embodiment discussed herein is related to effective detection of a communication apparatus performing an abnormal communication.

BACKGROUND

In recent years, the damage caused by targeted attacks against intra-organization networks such as enterprises and governments has been getting worse.

In targeted attacks, an attacker invades an intra-organization network by using, for example, malware to avoid detection by antivirus software. For this reason, it may be difficult to detect the occurrence of the targeted attacks with "entry countermeasures" which detects that an attacker has intruded from an external network to the intra-organization network.

Therefore, there are cases where "internal countermeasures" such as monitoring of an internal communication of the intra-organization network and detecting behaviors by attackers are implemented.

An attacker sometimes aims to obtain a file including confidential information or the like that could be obtained by a search activity of the intra-organization network and transmit the file to the external network. In a case where there are a plurality of files that such an attacker tries to obtain, when individual files are transmitted to the external network, a communication is continuously generated from the intra-organization network to the external network. Here, in a case where a monitoring device for monitoring the boundary between the intra-organization network and the external network is installed, the monitoring device may determine that the communication continuously occurring to the external network is abnormal.

Therefore, in order to avoid detection by such a monitoring device, the attacker is supposed to try to minimize the occurrence of the communication from the intra-organization network to the external network. For example, the attacker installs an unauthorized server (may be referred to as "staging server" or the like) for aggregating files collected in the intra-organization network to hosts existing in the intra-organization network. Then, after files are adequately collected, the attacker compresses the files in an illegally installed server into one file and transmits the compressed file to the external network.

In order to restrain such an attacker from sending the file to the external network, a security administrator in the organization network detects the illegally installed server by the attacker in the intra-organization network. If it is possible to detect an illegally installed server, in a case where a communication from the illegally installed server to the external network has occurred, it is possible to determine that there is a possibility that an unauthorized file transmission by an attacker has occurred with respect to the illegally installed server. As a result, the security administrator may take countermeasures such as blocking the communication to the external network or making inquiries to the administrator of the host which became the illegally installed server.

Japanese Laid-open Patent Publication No. 2005-275683 and Junji Nakazato, Yu Tsuda, and Yaichiro Takagi, "Suspicious Process Analysis in Cooperation with End Hosts", Research reports on Information and Telecommunications Research Institute Vol. 63 No. 2 (December 2016) are examples of the related art.

SUMMARY

According to an aspect of the embodiments, an apparatus extracts a server process from a communication in a network to generate log data in which a combination of addresses of access sources in the server process is recorded, and compares a combination of past addresses recorded in the log data with a combination of addresses in a specific target access to identify a first communication apparatus performing an abnormal communication.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 6A-6C are tables exemplifying a server process authentication log, a profile database (DB) and an abnormal communication apparatus internet protocol (IP) address list in the network monitoring device illustrated in FIG. 4;

FIG. 7 is a diagram for describing generation processing of a profile DB in the network monitoring device illustrated in FIG. 4;

FIG. 8 is a diagram for describing processing in a case where an abnormal communication apparatus is detected in the network monitoring device illustrated in FIG. 4;

FIG. 9 is a diagram for describing processing in a case where an abnormal communication apparatus is not detected in the network monitoring device illustrated in FIG. 4;

FIG. 11 is a flowchart illustrating determination processing of the abnormal communication apparatus in the network monitoring device illustrated in FIG. 4; and FIG. 12 is a flowchart illustrating determination processing of the abnormal communication apparatus in the network monitoring device illustrated in FIG. 4.

DESCRIPTION OF EMBODIMENTS

Figure 1:
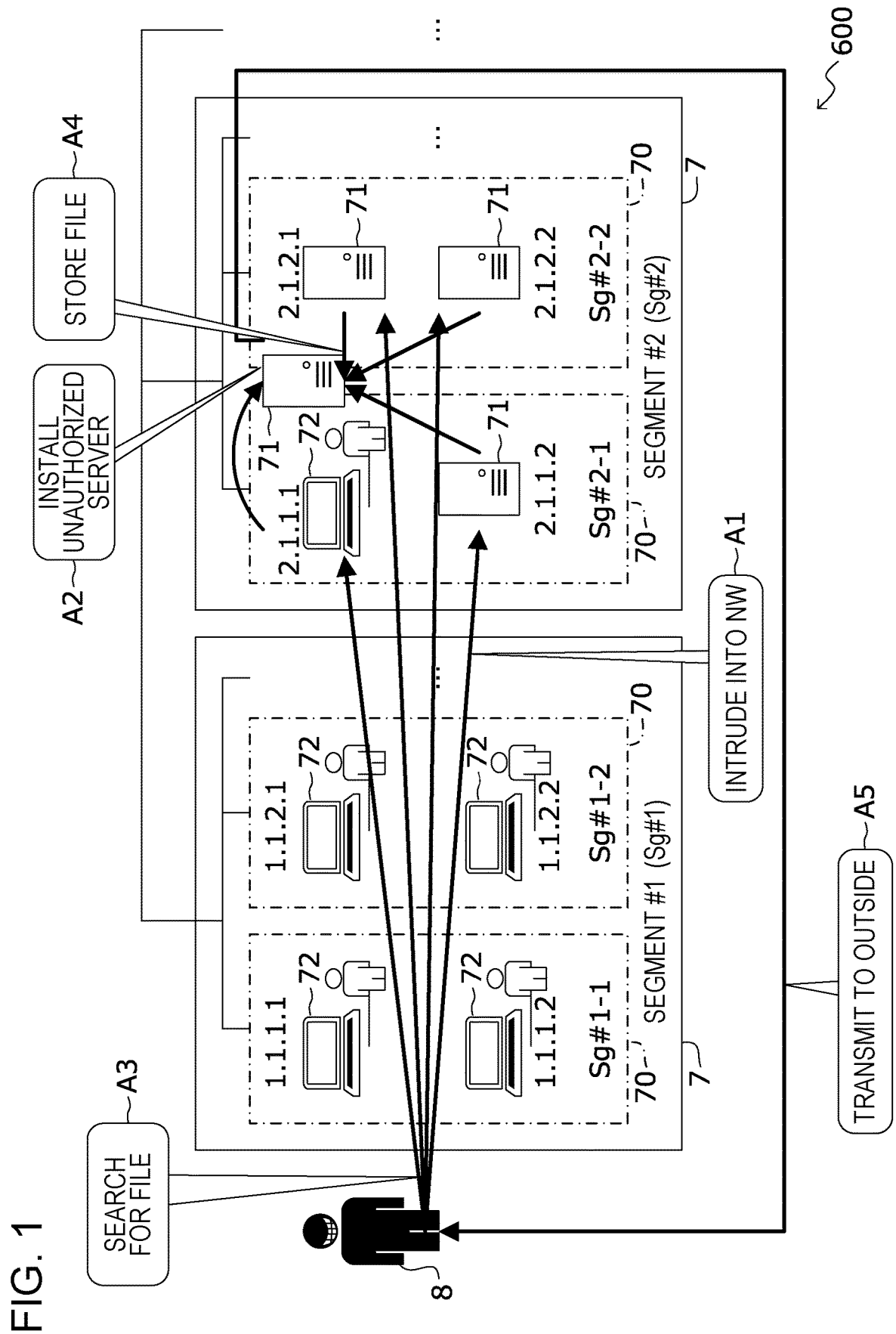
FIG. 1 is a diagram for describing an attack method by an attacker of an intra-organization network.

According to the detection method of an illegally installed server in the related art, there is a possibility that overlooking may occur in detection of an illegally installed server or an excessive load may be applied to the network.

It is preferable to identify a communication apparatus that performs an abnormal communication.

An embodiment will be described below with reference to drawings. However, the following embodiment is merely an example, and there is no intention to exclude the application of various modifications and techniques not explicitly described in the embodiment. That is, the present embodiment may be implemented with various modifications without departing from the gist thereof.

In addition, each drawing is not intended to include only the components illustrated in the drawing but may include other functions.

Hereinafter, in the drawings, the same reference numerals denote the same parts, and a description thereof will be omitted.

[A] RELATED EXAMPLE

FIG. 1 is a diagram for describing an attack method by an attacker 8 of an intra-organization network 600.

The intra-organization network 600 illustrated in FIG. 1 is divided into a plurality of segments (two segments in the illustrated example) 7 (which may be referred to as "segments #1 or #2"). In the diagram, "segment" is also written as "Sg".

Each segment 7 includes a segment 70 (which may be referred to as segment #1-1, #1-2, #2-1, or #2-2) that is smaller than segment 7. In the illustrated example, segments #1-1 and #1-2 belong to segment #1, and segments #2-1 and #2-2 belong to segment #2.

Each segment 70 includes a server 71 or a client 72. In the illustrated example, segment #1-1 includes two clients 72 identified by IP addresses 1.1.1.1 and 1.1.1.2, and segment #1-2 includes two clients 72 identified by IP addresses 1.1.2.1 and 1.1.2.2. In addition, segment #2-1 includes the client 72 identified by IP address 2.1.1.1 and the server 71 identified by IP address 2.1.1.2, and segment #2-2 includes two servers 71 identified by IP addresses 2.1.2.1 and 2.1.2.2.

The server 71 waits for a request from the client 72 for the purpose of data sharing.

The client 72 sends a request to the server 71 to perform authentication, data editing, change of settings, and the like.

It is assumed that the attacker 8 has accessed the intra-organization network (NW) 600 by fraudulent means and intruded into the intra-organization network (NW) 600 (see reference symbol A1).

It is assumed that the attacker 8 has installed the unauthorized server 71 in the intra-organization network 600 (see reference symbol A2). The illegally installed server 71 may be inserted by infecting a virus or the like with the server 71 regularly installed in the intra-organization network 600 or may function by physically installing a new server 71 in the intra-organization network 600.

The attacker 8 searches for a file including confidential information and the like in the server 71 and the client 72 of the intra-organization network 600 (see reference symbol A3).

The attacker 8 stores the searched file in the illegally installed server 71 (see reference symbol A4).

The attacker 8 compresses the file accumulated in the illegally installed server 71 in a ZIP format or the like and transmits the compressed file to an external network (see reference symbol A5).

Figure 2:
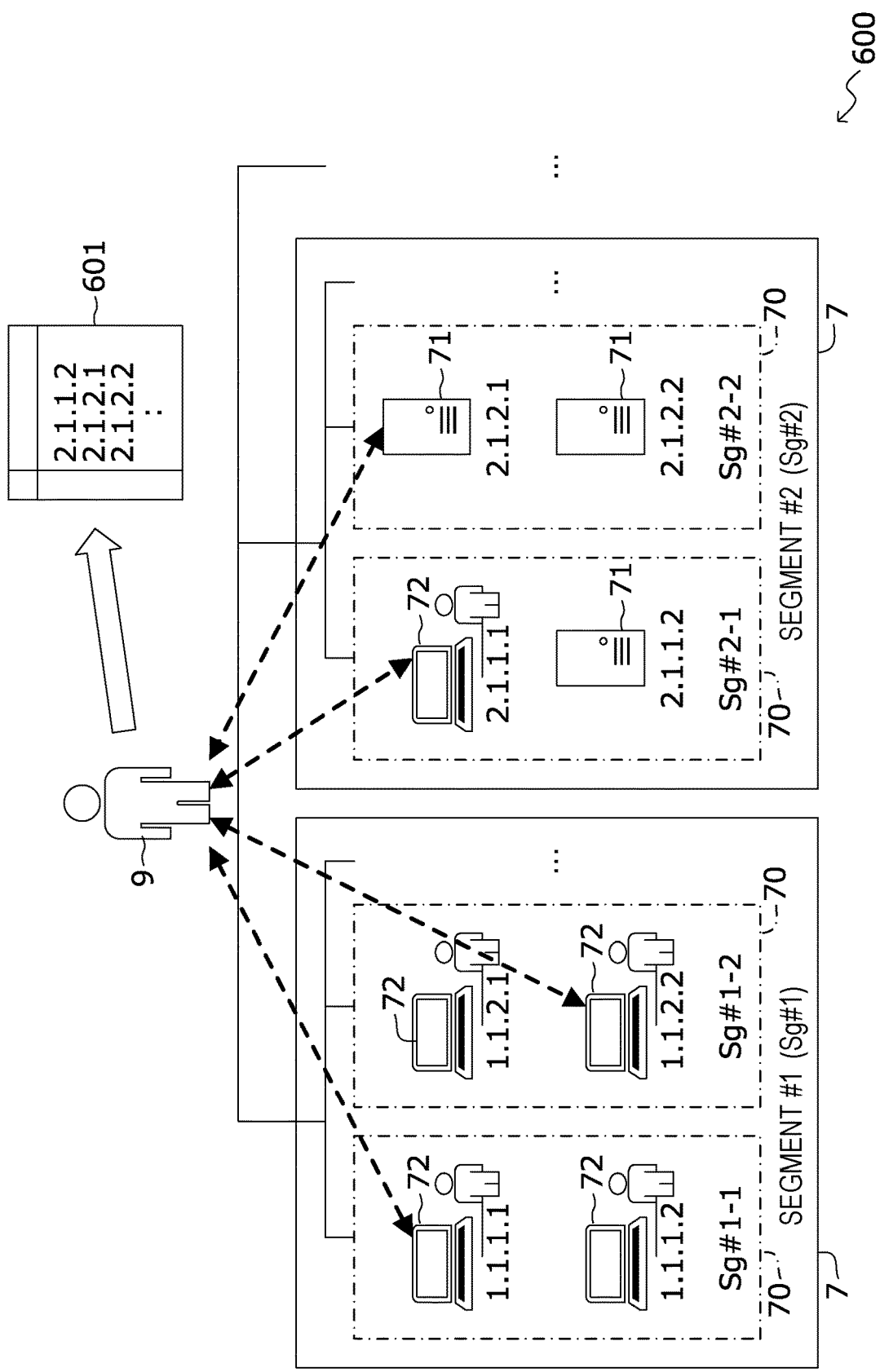
FIG. 2 is a diagram for describing a first example of detection processing of an illegally installed server in the intra-organization network as a related example.

FIG. 2 is a diagram for describing a first example of detection processing of the illegally installed server 71 in the intra-organization network 600 as a related example.

The intra-organization network 600 illustrated in FIG. 2 also has the same configuration as the intra-organization network 600 illustrated in FIG. 1.

An administrator 9 (may be referred to as "network administrator") illustrated in FIG. 2 monitors communications in the intra-organization network 600 and communications between the intra-organization network 600 and the external network through a firewall (not illustrated in FIG. 2) or the like. In the detection processing of the illegally installed server 71 illustrated in FIG. 2, the administrator 9 of the intra-organization network 600 searches for the hosts belonging to the intra-organization network 600 to identify and block the host having a server function.

In a specific system, software is installed in the hosts belonging to the intra-organization network 600, and the software monitors processes. In this case, since the server 71 is the unauthorized server 71 that has been installed by the attacker 8, it is determined that there is a doubt that the server 71 in which the host on which a server process is running is illegally installed.

In addition, the administrator 9 may execute network scan periodically for the intra-organization network 600. The administrator 9 may determine the host whose port that is not normally released is released as the illegally installed server 71.

In the example illustrated in FIG. 2, 2.1.1.2, 2.1.2.1, and 2.1.2.2 are registered in an Internet Protocol (IP) address list 601 for the server 71 in which the server process is running or the port which is not normally released is released. In a case where the server 71 registered in the IP address list 601 tries to connect to the external network, communications are blocked.

However, with the method illustrated in FIG. 2, since the server 71 on which software is not installed is not subject to process monitoring, there is a possibility that overlooking of the illegally installed server 71 may occur. In addition, when the network scan is periodically executed, the network bandwidth of the intra-organization network 600 is affected, and therefore there is a possibility that the convenience of the intra-organization network 600 may be reduced.

Figure 3:
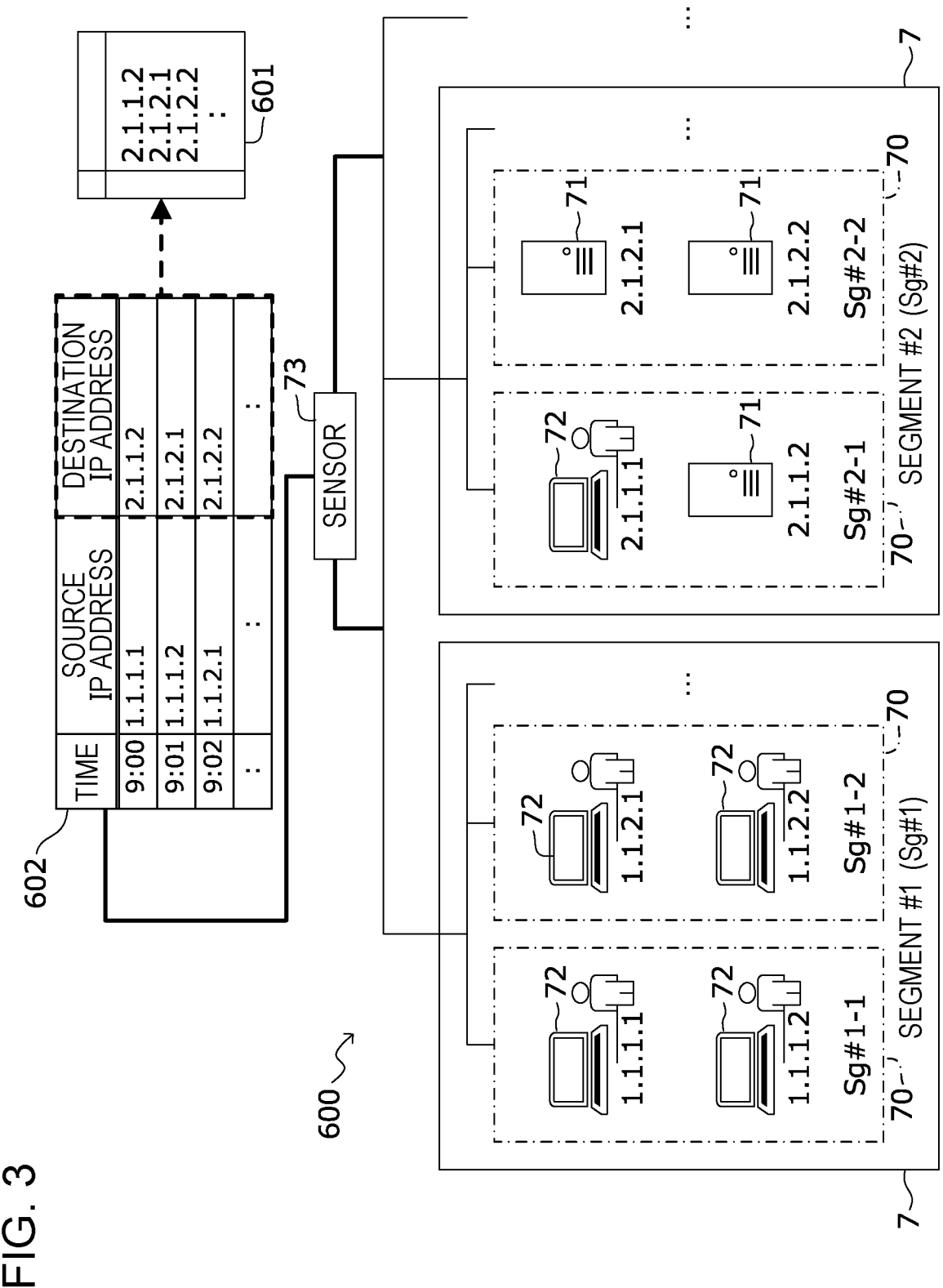
FIG. 3 is a diagram for describing a second example of detection processing of the illegally installed server in the intra-organization network as a related example.

FIG. 3 is a diagram for describing a second example of detection processing of the illegally installed server 71 in the intra-organization network 600 as a related example.

The intra-organization network 600 illustrated in FIG. 3 includes a sensor 73 (may be referred to as "network sensor") in addition to the same configuration as the intra-organization network 600 illustrated in FIG. 1.

The sensor 73 monitors communications flowing through the intra-organization network 600. The sensor 73 extracts a communication in which an IP address authenticates the server process with respect to another IP address. The IP address that is the authentication destination is determined as the IP address having the server process.

In the example illustrated in FIG. 3, in a server process authentication log 602, time, a source IP address, and a destination IP address are associated with each other. In the server process authentication log 602, a communication for authenticating the server process from IP address 1.1.1.1 to 2.1.1.2 at time 9:00 is registered. In addition, in the server process authentication log 602, a communication for authenticating the server process from IP address 1.1.1.2 to 2.1.2.1 at time 9:01 is registered. Further, in the server process authentication log 602, a communication for authenticating the server process from IP address 1.1.2.1 to 2.1.2.2 at time 9:02 is registered.

In the example illustrated in FIG. 3, 2.1.1.2, 2.1.2.1, and 2.1.2.2 registered as the destination IP addresses in the server process authentication log 602 are extracted into the IP address list 601 indicating the IP addresses having the server process. In a case where the server 71 registered in the IP address list 601 tries to connect to the external network, communications are blocked.

However, in the method illustrated in FIG. 3, in the IP addresses having the server process, there is a possibility that an IP address assigned to the server 71 installed for regular purpose such as a file server in a project may be included. In this case, since the IP address of the regular server 71 and the IP address of the illegally installed server 71 may not be distinguished from each other only by determining the presence or absence of the server process, there is a possibility of erroneously detecting the regular server 71 as the illegally installed server 71. Even the regular server 71 may be connected to the external network in order to update applications or the like, and if excessive blocking of the regular server 71 occurs, there is a possibility that the convenience may be reduced.

[B] ONE EXAMPLE OF EMBODIMENT

[B-1] Example of System Configuration

Figure 4:
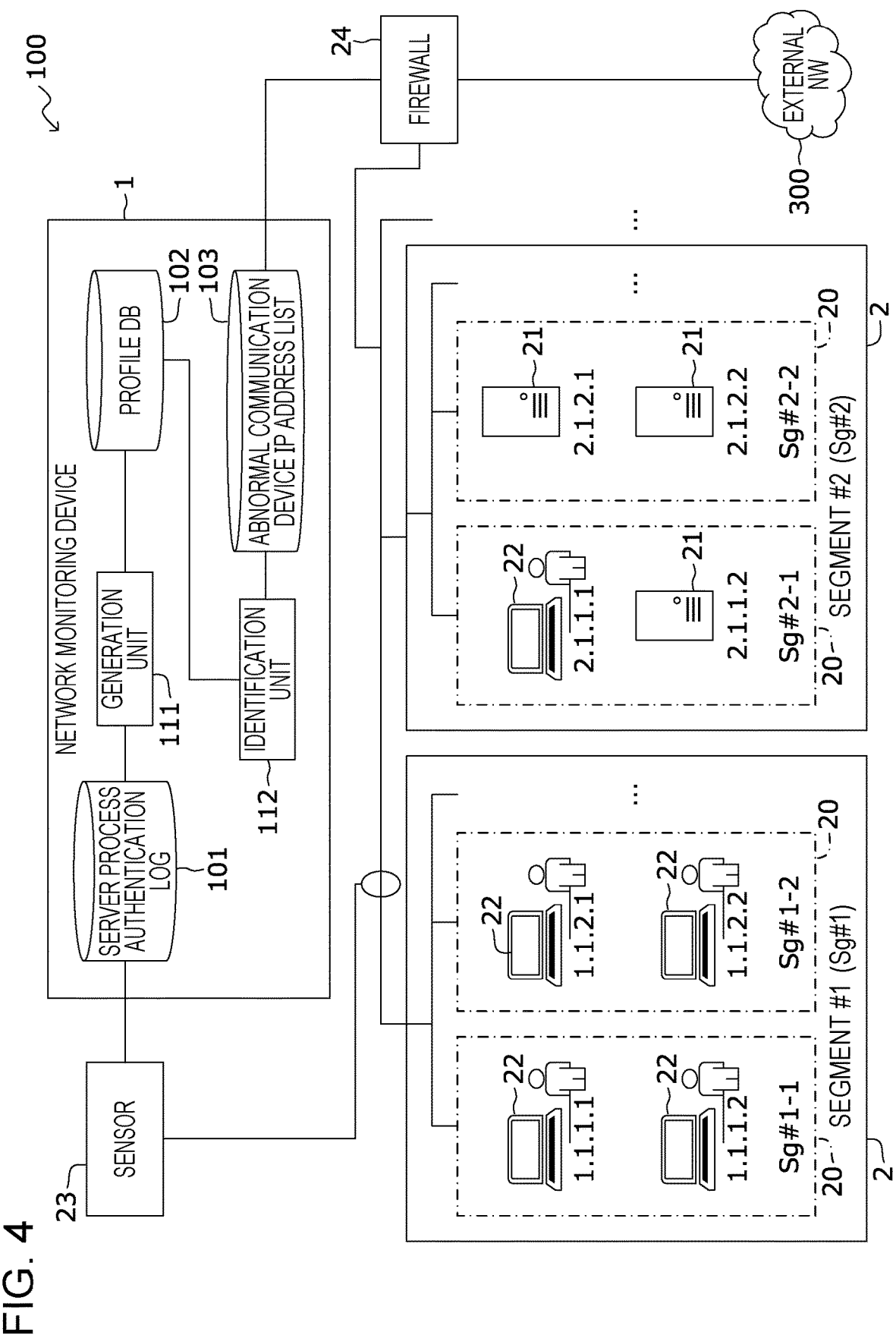
FIG. 4 is a block diagram schematically illustrating a system configuration of the intra-organization network in an example of an embodiment.

FIG. 4 is a block diagram schematically illustrating a system configuration of an intra-organization network 100 in an example of an embodiment.

The intra-organization network 100 is connected to an external network 300 and includes a network monitoring device 1, a plurality of (two in the illustrated example) segments 2 (may be referred to as "segment #1 or #2"), a sensor 23, and a firewall 24. The sensor 23 may be referred to as the network sensor 23.

The sensor 23 monitors communications in the intra-organization network 100. Specifically, the sensor 23 identifies the source and the destination of a communication in the intra-organization network 100.

The firewall 24 blocks the communication that is not supposed to be passed between the intra-organization network 100 and the external network 300.

Each segment 2 includes a segment 20 (which may be referred to as segment #1-1, #1-2, #2-1, or #2-2) that is smaller than segment 2. In the illustrated example, segments #1-1 and #1-2 belong to segment #1, and segments #2-1 and #2-2 belong to segment #2.

Each segment 20 includes a server 21 or a client 22. In the illustrated example, segment #1-1 includes two clients 22 identified by IP addresses 1.1.1.1 and 1.1.1.2, and segment #1-2 includes two clients 22 identified by IP addresses 1.1.2.1 and 1.1.2.2. In addition, segment #2-1 includes the client 22 identified by IP address 2.1.1.1 and the server 21 identified by IP address 2.1.1.2, and segment #2-2 includes two servers 21 identified by IP addresses 2.1.2.1 and 2.1.2.2.

The server 21 is an example of a communication apparatus and waits for a request from the client 22 for the purpose of data sharing.

The client 22 is an example of a communication apparatus, sends a request to the server 21, and performs authentication, data editing, change of settings, and the like.

The network monitoring device 1 functions as both a generation unit 111 and an identification unit 112 and holds a server process authentication log 101, a profile DB 102, and an abnormal communication apparatus IP address list 103.

The server process authentication log 101 holds the source IP address and the destination IP address of the communication for each time on the intra-organization network 100, which is acquired by the sensor 23. Details of the server process authentication log 101 will be described later with reference to (1) in FIG. 6 and the like.

The generation unit 111 aggregates server process IP addresses and groups of client IP addresses from the relationship between the source IP addresses and the destination IP addresses included in the server process authentication log 101 to generate the profile DB 102. Here, the server process IP address indicates the IP address of the server 21 having the server process. In addition, a group of client IP addresses indicates the IP address of one or more clients 72. Details of the function in the generation unit 111 will be described later with reference to FIG. 7 and the like.

The profile DB 102 holds a server process IP address and a group of client IP addresses in association with each other. Details of the profile DB 102 will be described later with reference to (2) in FIG. 6 and the like.

The identification unit 112 identifies the server 21 performing an abnormal communication from the profile DB 102 as an abnormal communication apparatus (may be referred to as "illegally installed server" or "staging server") and registers the server 21 in the abnormal communication apparatus IP address list 103. Details of the function in the identification unit 112 will be described later with reference to FIGS. 8 and 9, and the like.

The abnormal communication apparatus IP address list 103 holds the IP address of the server 21 determined as the abnormal communication apparatus by the identification unit 112. Details of the abnormal communication apparatus IP address list 103 will be described later with reference to (3) in FIG. 6 and the like.

Since the purpose of the server 21 regularly installed in the intra-organization network 100 is defined, it is assumed that the IP address serving as an access source and the number of access sources are substantially defined.

For example, it is assumed that a project file sharing server shared by members of a specific project in a department is accessed only from the IP addresses belonging to one specific segment 7 or 70. On the other hand, it is assumed that an internal file sharing server is accessed from IP addresses belonging to a specific plurality of segments 7 or 70 and the access source is also fixed.

Therefore, the network monitoring device 1 in the example of the embodiment records a pattern of the IP address as the access source for the IP address determined to have the server process. As a result, in a case where the network monitoring device 1 is accessed with a pattern of an IP address that is not recorded, the network monitoring device 1 determines that the IP address of the access destination is an abnormal communication apparatus.

Figure 5:
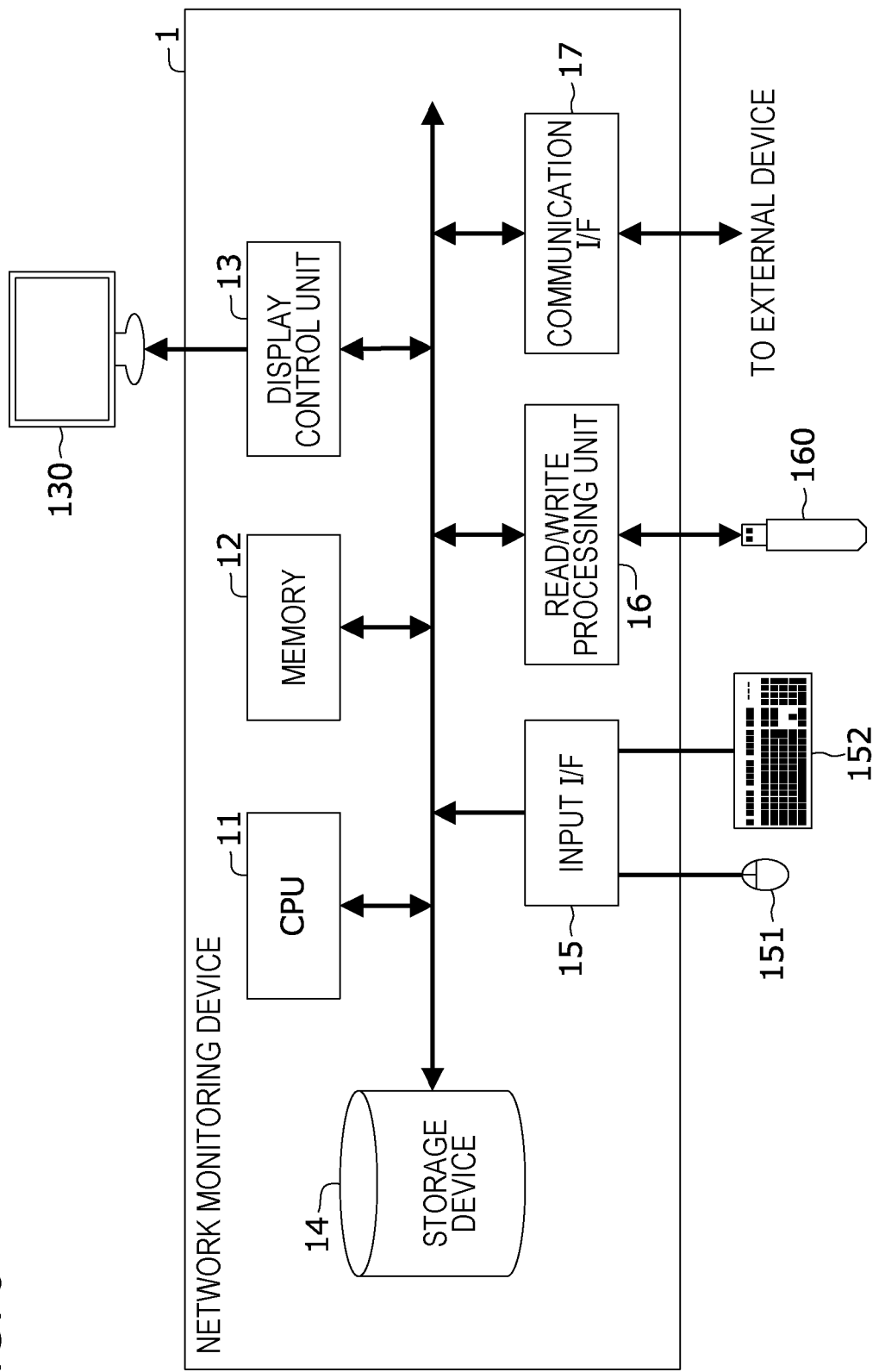
FIG. 5 is a block diagram schematically illustrating a hardware configuration of a network monitoring device illustrated in FIG. 4.

FIG. 5 is a block diagram schematically illustrating a hardware configuration of the network monitoring device 1 illustrated in FIG. 4.

The network monitoring device 1 includes a central processing unit (CPU) 11, a memory 12, a display control unit 13, a storage device 14, an input interface (I/F) 15, a read/write processing unit 16, and a communication I/F 17.

For example, the memory 12 is a storage device including a read only memory (ROM) and a random-access memory (RAM). A program such as basic input/output system (BIOS) or the like may be written in the ROM of the memory 12. The software program of the memory 12 may be read and executed by the CPU 11 appropriately. In addition, the RAM of the memory 12 may be used as a primary recording memory or a working memory.

The display control unit 13 is connected to a display device 130 and controls the display device 130. The display device 130 is a liquid crystal display, an organic light-emitting diode (OLED) display, a cathode ray tube (CRT), an electronic paper display, and the like, and displays various information for an operator such as the administrator of the intra-organization network 100. The display device 130 may display contents of the server process authentication log 101, the profile DB 102, and the abnormal communication apparatus IP address list 103, which will be described later with reference to FIG. 6. The display device 130 may be combined with an input device, for example, a touch panel.

For example, a hard disk drive (HDD), a solid-state drive (SSD), a storage class memory (SCM), or the like may be used as the storage device 14 to store data in a readable and writable manner. The storage device 14 stores the server process authentication log 101, the profile DB 102, and the abnormal communication apparatus IP address list 103, which will be described later with reference to FIG. 6.

The input I/F 15 is connected to input devices such as a mouse 151 and a keyboard 152 and controls input devices such as the mouse 151 and the keyboard 152. The mouse 151 and the keyboard 152 are examples of input devices, and the operator performs various input operations via these input devices.

The read/write processing unit 16 is configured so that a recording medium 160 may be mounted. The read/write processing unit 16 is configured to be capable of reading the information recorded on the recording medium 160 in a state where the recording medium 160 is mounted. In this example, the recording medium 160 has portability. For example, the recording medium 160 is a flexible disk, an optical disk, a magnetic disk, a magneto-optical disk, a semiconductor memory, or the like.

The communication I/F 17 is an interface for enabling communication with an external device. The network monitoring device 1 communicates with the sensor 23, the firewall 24, and the like via the communication I/F 17.

The CPU 11 is a processing device that performs various controls and calculations and realizes various functions by executing OS and programs stored in the memory 12. That is, as illustrated in FIG. 4, the CPU 11 of the network monitoring device 1 functions as the generation unit 111 and the identification unit 112.

A program for realizing the functions of the generation unit 111 and the identification unit 112 is provided in a form recorded on the above-described recording medium 160, for example. Then, a computer reads the program (may be referred to as "network monitoring program") from the recording medium 160 via the read/write processing unit 16, transfers the program to an internal storage device or an external storage device to store and use the program. In addition, the program may be recorded in a storage device (recording medium) such as a magnetic disk, an optical disk, a magneto-optical disk, and the like and may be provided from the storage device to the computer via a communication path.

When realizing functions of the generation unit 111 and the identification unit 112, the program stored in the internal storage device is executed by a microprocessor of the computer. At this time, the computer may read and execute the program recorded on the recording medium 160. In the present embodiment, the internal storage device is the memory 12, and the microprocessor is the CPU 11.

For example, the CPU 11 controls the overall operation of the network monitoring device 1. A device for controlling the overall operation of the network monitoring device 1 is not limited to the CPU 11 and may be any one of, for example, an MPU, a DSP, an ASIC, a PLD, and an FPGA. In addition, the device for controlling the overall operation of the network monitoring device 1 may be a combination of two or more of CPU, MPU, DSP, ASIC, PLD, and FPGA. MPU stands for micro processing unit, DSP stands for digital signal processor, and ASIC stands for application specific integrated circuit. In addition, PLD stands for programmable logic device, and FPGA stands for field programmable gate array.

FIG. 6A is a diagram exemplifying the server process authentication log 101 in the network monitoring device 1 illustrated in FIG. 4.

In the server process authentication log 101, time, a source IP address, and a destination IP address are associated with each other.

In the example illustrated in FIG. 6A, there is a communication from IP address 1.1.1.1 to 2.1.1.2 at 9:00 on Apr. 30, 2018, and there is a communication from IP address 1.1.1.2 to 2.1.2.1 at 9:01 on Apr. 30, 2018. In addition, there is a communication from IP address 1.1.2.1 to 2.1.2.1 at 9:02 on Apr. 30, 2018.

FIG. 6B is a diagram exemplifying the profile DB 102 in the network monitoring device 1 illustrated in FIG. 4.

In the profile DB 102, which is an example of log data, aggregation time, a server process IP address, and a group of client IP addresses are associated with each other.

That is, in the profile DB 102 illustrated in FIG. 6B, the IP address list 601 in the related example illustrated in FIGS. 2 and 3 is expanded by registering a group of client IP addresses.

In the group of client IP addresses, individual IP addresses of the server 21 functioning as a client or the client 22 may not be registered. For example, in the group of client IP addresses, the identification number of the segment 2 or 20 to which the server 21 functioning as a client or the client 22 belongs may be registered.

In the example illustrated in FIG. 6B, at 0:00 on May 1, 2018, a group of client IP address 1.1.1.1 is aggregated and associated with the server process IP address 2.1.2.1. In addition, at 0:00 on May 1, 2018, a group of client IP addresses 1.1.1.2 and 1.1.2.1 are aggregated and associated with the server process IP address 2.1.1.2.

FIG. 6C is a diagram exemplifying the abnormal communication apparatus IP address list 103 in the network monitoring device 1 illustrated in FIG. 4.

In the abnormal communication apparatus IP address list 103, determination time and an abnormal communication apparatus IP address are associated with each other.

In the example illustrated in FIG. 6C, at 0:00 on May 1, 2018, it is registered that the server 21 with the IP address 2.1.1.1 is determined as an abnormal communication apparatus.

FIG. 7 is a diagram for describing generation processing of the profile DB 102 in the network monitoring device 1 illustrated in FIG. 4.

In the example illustrated in FIG. 7, the server 21 identified by the IP address 2.1.1.2 functions as an internal file sharing server and is accessed from the client 22 identified by the IP addresses 1.1.1.2 and 1.1.2.1 (see reference symbol B1).

In addition, in the example illustrated in FIG. 7, the server 21 identified by the IP address 2.1.2.1 functions as a project file sharing server and is accessed from the client 22 identified by the IP address 1.1.1.1 (see reference symbol B2).

In this example, the internal file sharing server is shared by the personnel in the department where the intra-organization network 100 is deployed, and the project file sharing server is shared by the members of the specific project in the department. That is, the internal file sharing server tends to be accessed from a wider range of clients 22 than the project file sharing server.

The generation unit 111 registers the communications in the intra-organization network 100 acquired by the sensor 23 in the server process authentication log 101 and aggregates the communications in a table 1011 (see reference symbol B3).

In the table 1011, IP addresses 1.1.1.2 and 1.1.2.1 of the client 22 are associated with the IP address 2.1.1.2 having the server process. In addition, in the table 1011, the IP address 1.1.1.1 functioning as a client is associated with the IP address 2.1.2.1 having a process as the server 21.

The generation unit 111 adds the correspondence relationship aggregated in the table 1011 to the profile DB 102 in which the correspondence relationship between the past server process IP address and the group of client IP addresses is accumulated (see reference symbol B4).

In the example illustrated in FIG. 7, in the profile DB 102, at 0:00 on May 1, 2018, the group of client IP addresses 1.1.1.2 and 1.1.2.1 are aggregated and associated with the server process IP address 2.1.1.2. In addition, at 0:00 on May 1, 2018, the group of client IP address 1.1.1.1 is aggregated and associated with the server process IP address 2.1.2.1.

That is, the generation unit 111 extracts the server process from the communications in the intra-organization network 100 to generate the profile DB 102 in which a combination of the access source IP addresses in the extracted server process is recorded.

The generation processing of the profile DB 102 illustrated in FIG. 7 may be executed periodically, for example, once a day.

FIG. 8 is a diagram for describing processing in a case where an abnormal communication apparatus is detected in the network monitoring device 1 illustrated in FIG. 4.

In the example illustrated in FIG. 8, an access to the client 22 identified by the IP address 2.1.1.1 has occurred from the server 21 identified by the IP addresses 2.1.1.2, 2.1.2.1, and 2.1.2.2 (see reference symbol C1).

The generation unit 111 registers the communications in the intra-organization network 100 acquired by the sensor 23 in the server process authentication log 101 to aggregate the communications in a latest profile result 1012 (see reference symbol C2).

In the latest profile result 1012, the IP addresses 2.1.1.2, 2.1.2.1, and 2.1.2.2 functioning as clients are associated with the IP address 2.1.1.1 having the server process.

The identification unit 112 (illustrated in FIG. 4) compares the contents of the latest profile result 1012 with the contents of the profile DB 102 (see reference symbol C3).

In the example illustrated in FIG. 8, in the profile DB 102, at 0:00 on May 1, 2018, the group of client IP addresses 1.1.1.2 and 1.1.2.1 are aggregated and associated with the server process IP address 2.1.1.2. In addition, at 0:00 on May 1, 2018, the group of client IP address 1.1.1.1 is aggregated and associated with the server process IP address 2.1.2.1.

The identification unit 112 refers to the latest profile result 1012 to determine whether there is a combination of the IP addresses 2.1.1.2, 2.1.2.1, and 2.1.2.2, which are functioning as clients, in the groups of client IP addresses of the profile DB 102. In the illustrated example, since there is no combination of IP addresses functioning as clients in the profile DB 102, the identification unit 112 determines that the client 22 identified by the IP address 2.1.1.1 having the server process is an abnormal communication apparatus.

In a case where there is the server 21 or the client 22 that is determined to be an abnormal communication apparatus by the identification unit 112, the communication between the intra-organization network 100 and the external network 300 may be blocked.

That is, the identification unit 112 compares a combination of the past IP addresses recorded in the profile DB 102 with a combination of the IP addresses in a specific target access to identify the server 21 or the client 22 which is performing an abnormal communication.

Specifically, the identification unit 112 identifies the server 21 or the client 22 accessed by a combination of IP addresses that does not exist in the profile DB 102 in the specific target access as an abnormal communication apparatus.

FIG. 9 is a diagram for describing processing in a case where an abnormal communication apparatus is not detected in the network monitoring device 1 illustrated in FIG. 4.

In the example illustrated in FIG. 9, an access from the client 22 identified by the IP address 1.1.1.1 to the server 21 identified by the IP address 2.1.2.1 has occurred (see reference symbol D1).

The generation unit 111 (illustrated in FIG. 4) registers the communications in the intra-organization network 100 acquired by the sensor 23 in the server process authentication log 101 to aggregate the communications in a latest profile result 1012 (see reference symbol D2).

In the latest profile result 1012, the IP address 1.1.1.1 functioning as a client is associated with the IP address 2.1.2.1 having the server process.

The identification unit 112 (illustrated in FIG. 4) compares the contents of the latest profile result 1012 with the contents of the profile DB 102 (see reference symbol D3).

In the example illustrated in FIG. 9, in the profile DB 102, at 0:00 on May 1, 2018, the group of client IP addresses 1.1.1.2 and 1.1.2.1 are aggregated and associated with the server process IP address 2.1.1.2. In addition, at 0:00 on May 1, 2018, the group of client IP address 1.1.1.1 is aggregated and associated with the server process IP address 2.1.2.1.

The identification unit 112 refers to the latest profile result 1012 to determine whether there is the IP address 1.1.1.1 functioning as a client in the group of client IP addresses of the profile DB 102. In the illustrated example, since there is an IP address functioning as a client in the profile DB 102, the identification unit 112 determines that the client 22 identified by the IP address 2.1.2.1 having the server process is not an abnormal communication apparatus.

[B-2] Example of Operation

Figure 10:
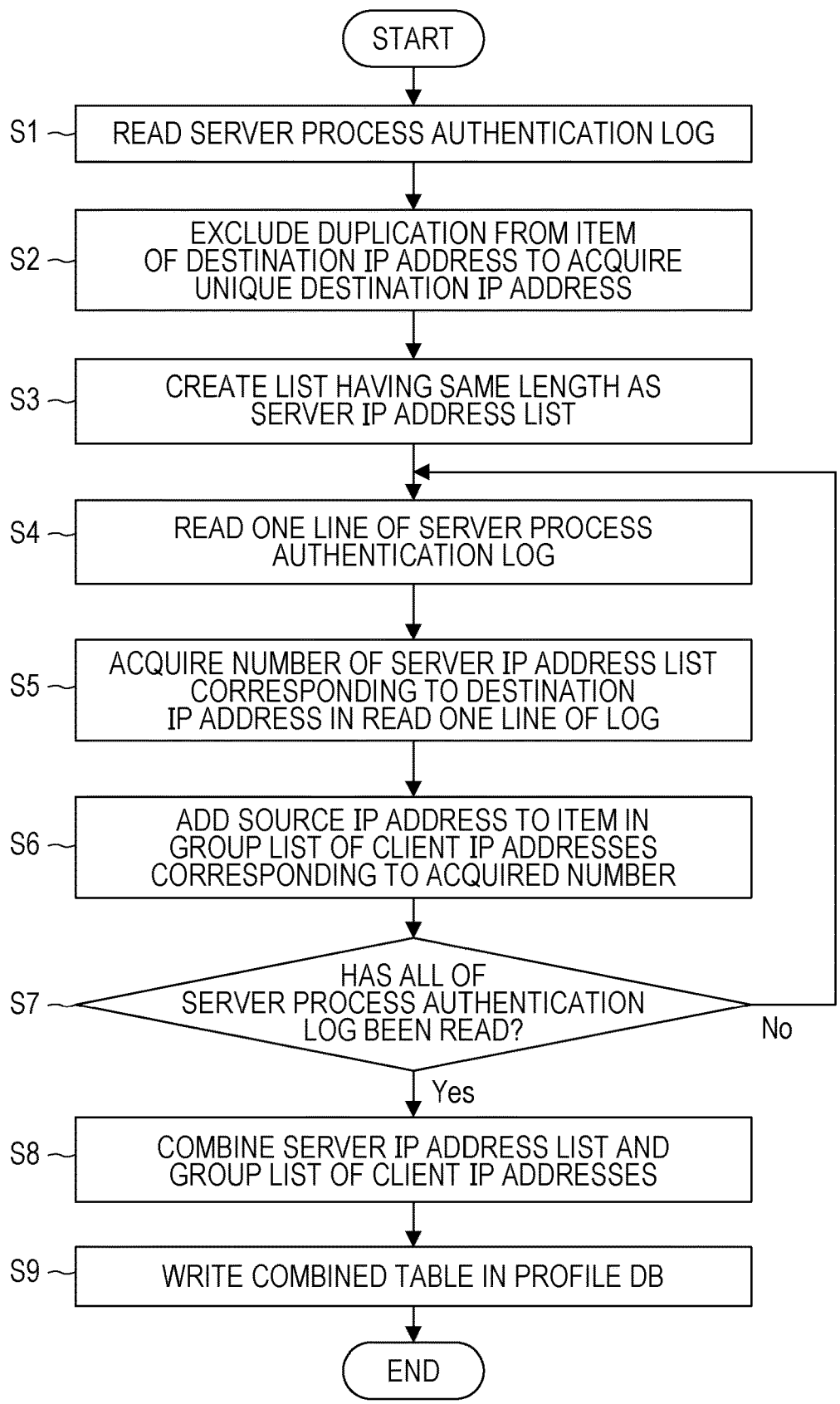
FIG. 10 is a flow chart for describing aggregation processing of an access source in the network monitoring device illustrated in FIG. 4.

The aggregation processing of the access source in the network monitoring device 1 illustrated in FIG. 4 will be described according to the flowchart (steps S1 to S9) illustrated in FIG. 10.

The generation unit 111 reads the server process authentication log 101 (step S1).

The generation unit 111 excludes duplicates from the items of the destination IP address to acquire a unique destination IP address as a server IP address list (step S2).

The generation unit 111 creates a list having the same length as the server IP address list (step S3).

The generation unit 111 reads one line of the server process authentication log 101 (step S4).

The generation unit 111 acquires the number of the server IP address list corresponding to the destination IP address within one line of the read server process authentication log 101 (step S5).

The generation unit 111 adds the source IP address to the item in the client IP address group list corresponding to the acquired number (step S6).

The generation unit 111 determines whether all of the server process authentication log 101 has been read (step S7).

In a case where there is a line that has not been read in the server process authentication log 101 (see the No route of step S7), the processing returns to step S4.

On the other hand, in a case where all of the server process authentication log 101 has been read (see the Yes route of step S7), the generation unit 111 generates the table 1011 (see FIG. 7) in which the server IP list and the client IP address are combined (step S8).

The generation unit 111 writes the combined table 1011 in the profile DB 102 (step S9). Then, the aggregation processing of the access source ends.

Next, the determination processing of an abnormal communication apparatus in the network monitoring device 1 illustrated in FIG. 4 will be described according to the flowcharts (steps S11 to S23) illustrated in FIGS. 11 and 12. FIG. 11 illustrates the processing in steps S11 to S17, and FIG. 12 illustrates the processing in steps S18 to S23.

The identification unit 112 reads the log in the profile DB 102 (step S11 in FIG. 11).

The identification unit 112 extracts the log of the latest profile DB 102 as the latest profile result 1012 (see FIGS. 8 and 9) (step S12 in FIG. 11).

The identification unit 112 reads one line of the latest profile result 1012 (step S13 in FIG. 11).

The identification unit 112 sets Flag to False (step S14 in FIG. 11).

The identification unit 112 extracts a group of client IP addresses from the read latest profile result 1012 (step S15 in FIG. 11).

The identification unit 112 reads one line of the log of the profile DB 102 (step S16 in FIG. 11).

The identification unit 112 compares a group of client IP addresses to be determined with the group of client IP addresses in the log of the read profile DB 102 (step S17 in FIG. 11).

The identification unit 112 determines whether the group of client IP addresses matches as a result of the comparison in step S17 in FIG. 11 (step S18 in FIG. 12).

In a case where the group of client IP addresses does not match (see the No route in step S18 in FIG. 12), the processing proceeds to step S20 in FIG. 12.

On the other hand, in a case where the group of client IP addresses matches (see the Yes route of step S18 in FIG. 12), the identification unit 112 sets Flag to True (step S19 in FIG. 12).

The identification unit 112 determines whether all of the log in the profile DB 102 has been read (step S20 in FIG. 12).

In a case where there is a log that has not been read in the profile DB 102 (see the No route of step S20 in FIG. 12), the processing proceeds to step S16 in FIG. 11.

On the other hand, in a case where all of the log in the profile DB 102 has been read (see the Yes route in step S20 in FIG. 12), the identification unit 112 determines whether Flag is False (step S21 in FIG. 12).

In a case where Flag is not False (see the No route in step S21 in FIG. 12), the processing proceeds to step S23 in FIG. 12.

On the other hand, in a case where Flag is False (see the Yes route of step S21 in FIG. 12), the identification unit 112 determines that the server 21 or the client 22 identified by the server process IP address in the latest profile result 1012 is an abnormal communication apparatus. Then, the identification unit 112 stores the server process IP address in the latest profile result 1012 in the abnormal communication apparatus IP address list 103 (step S22 in FIG. 12).

The identification unit 112 determines whether all of the latest profile result 1012 has been read (step S23 in FIG. 12).

In a case where there is the latest profile result 1012 which has not been read (see the No route of step S23 in FIG. 12), the processing proceeds to step S13 in FIG. 11.

On the other hand, if all of the latest profile result 1012 has been read (see the Yes route of step S23 in FIG. 12), determination processing of an abnormal communication apparatus ends.

That is, the identification unit 112 sets a first value in a flag for each of the server 21 or the client 22 having the server process. In addition, the identification unit 112 changes the flag for the server 21 or the client 22 which is not identified as an abnormal communication apparatus from the first value to a second value. Then, the identification unit 112 outputs the IP address of the server 21 or the client 22 whose flag is set to the first value as the abnormal communication apparatus IP address list 103.

[B-3] Effect

According to the network monitoring device 1 in the example of the above-described embodiment, for example, the following effects may be obtained.

The generation unit 111 extracts the server process from the communications in the intra-organization network 100 to generate the profile DB 102 in which a combination of the access source IP addresses in the extracted server process is recorded. In addition, the identification unit 112 compares a combination of the past IP addresses recorded in the profile DB 102 with a combination of the IP addresses in a specific target access to identify the server 21 or the client 22 which is performing an abnormal communication.

As a result, it is possible to periodically record the information obtained from the sensor 23 installed in the intra-organization network 100 and to learn the installation status of the regular server 21 or the client 22 and the access pattern for the regular server 21 or the client 22. Therefore, it is possible to efficiently perform identification of an abnormal communication apparatus, as compared with the case where an abnormal communication apparatus is identified by the security administrator in the intra-organization network 100.

The identification unit 112 identifies the server 21 or the client 22 accessed by a combination of IP addresses that does not exist in the profile DB 102 in the specific target access as an abnormal communication apparatus.

As a result, it is possible to determine that the server 21 or the client 22 existing in the learned access pattern is a regular communication apparatus and to determine the server 21 or the client 22 not existing in the learned access pattern as an abnormal communication apparatus. Then, it is possible to appropriately select the server 21 or the client 22 whose communication to the external network 300 is supposed to be monitored.

The identification unit 112 sets a first value in a flag for each of the server 21 or the client 22 having the server process. In addition, the identification unit 112 changes the flag for the server 21 or the client 22 which is not identified as an abnormal communication apparatus from the first value to a second value. The identification unit 112 outputs the IP address of the server 21 or the client 22 whose flag is set to the first value as the abnormal communication apparatus IP address list 103.

Thereby, even in a case where there are a plurality of abnormal communication apparatuses in the intra-organization network 100, it is possible to accurately identify the abnormal communication apparatuses. In addition, it is possible to present the output abnormal communication apparatus IP address list 103 to the administrator or the like of the intra-organization network 100 and to cope with the abnormal communication apparatuses appropriately and promptly.

[C] OTHER

The disclosed technique is not limited to the above-described embodiment, and various modifications may be made without departing from the spirit of the present embodiment. Each configuration and each processing of the present embodiment may be selected by demand or may be combined as appropriate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A network monitoring device comprising:
a memory; and
a processor coupled to the memory and configured to:
extract a server process from a communication in a network to generate log data in which a combination of addresses of access sources in the server process is recorded;
identify a pattern of the combination of addresses associated with the server process; and
compare a combination of past addresses recorded in the log data with a combination of addresses in a specific target access to determine whether the combination of addresses matches the pattern and identify one or more first communication apparatuses performing an abnormal communication.

2. The network monitoring device of claim 1, wherein the processor identifies a communication apparatus accessed by a combination of addresses not existing in the log data as the first communication apparatus, in the specific target access.

3. The network monitoring device of claim 1, wherein the processor is configured to:
set a first value to a flag for each communication apparatus having the server process,
change the flag of a communication apparatus not identified as the first communication apparatus from the first value to a second value, and
output an address of a communication apparatus whose flag is set to the first value as a list of the first communication apparatuses.

4. A network monitoring method comprising:
extracting a server process from a communication in a network to generate log data in which a combination of addresses of access sources in the server process is recorded;
identifying a pattern of the combination of addresses associated with the server process; and
comparing a combination of past addresses recorded in the log data with a combination of addresses in a specific target access to determine whether the combination of addresses matches the pattern and identify one or more first communication apparatus apparatuses performing an abnormal communication.

5. The network monitoring method of claim 4, further comprising identifying a communication apparatus accessed by a combination of addresses not existing in the log data as the first communication apparatus, in the specific target access.

6. The network monitoring method of claim 4, further comprising:
setting a first value to a flag for each communication apparatus having the server process;
changing the flag of a communication apparatus not identified as the first communication apparatus from the first value to a second value; and
outputting an address of a communication apparatus whose flag is set to the first value as a list of the first communication apparatuses.

* * * * *